Dec. 28, 1965   W. GUGEL ETAL   3,226,093
MIXING APPARATUS FOR MULTI COMPONENT RESIN
Filed Nov. 23, 1962
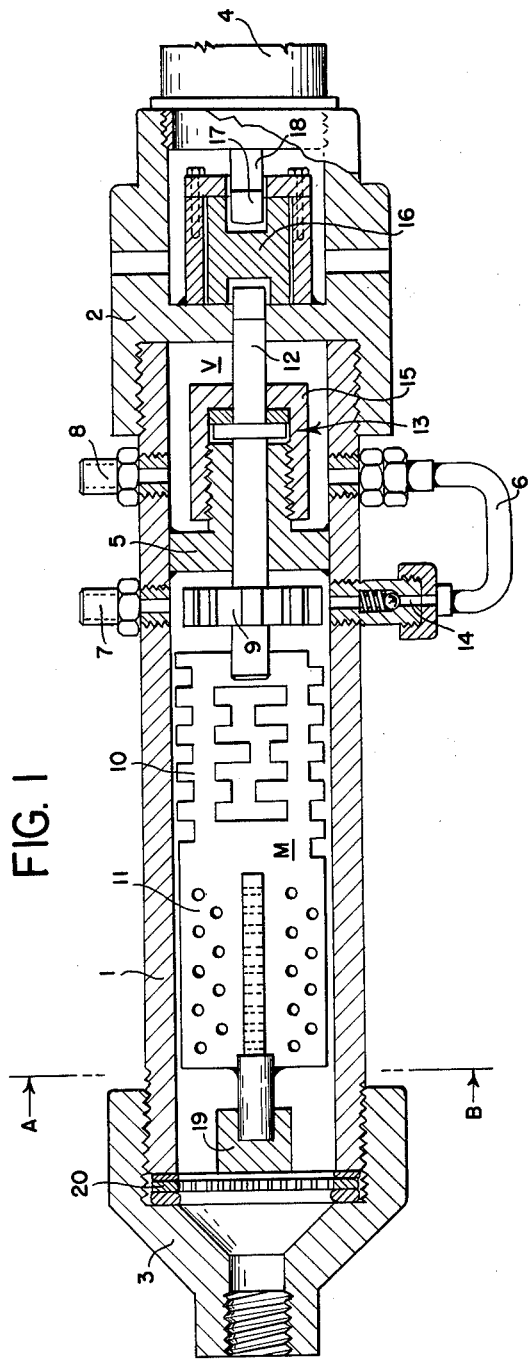
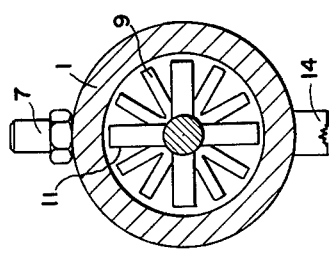
INVENTOR.
WALTER GUGEL
MAX GERHARDT
BY Harold D. Jastram
ATTORNEY

United States Patent Office 3,226,093
Patented Dec. 28, 1965

3,226,093
MIXING APPARATUS FOR MULTI COMPONENT RESIN
Walter Gugel, Kamen, Westphalia, and Max Gerhardt, Cologne-Zollstock (Rhine), Germany, assignors to General Mills, Inc., a corporation of Delaware
Filed Nov. 23, 1962, Ser. No. 239,644
Claims priority, application Germany, Dec. 8, 1961, Sch 30,684
1 Claim. (Cl. 259—7)

It is known that porous rock formations may be fortified through injection of hardenable materials in the hollow spaces of the porous rock formations. It has also been proposed to use synthetic resins for this purpose. In order that this kind of material may be introduced into fine crevices and cracks, the highest pressure possible is necessary. Multiple-component resins are especially useful because of their marked adhesiveness. Prerequisite for successful application of such resins, is an intimate intermixture of the reaction products, which intermixing may take place, for example, in a mixing chamber. The mixing chamber can be formed so that a mixing agent is driven by an air pressure motor set up outside the mixing chamber. The resin components can be fed into the mixing chamber by high pressure pumps which have power to deliver the necessary pressure for the injection of the resin into the rock formations.

The pressures which occur in this injection into the rock, place special demands on the construction of a mixing chamber. It is difficult to perfectly seal the entrance of the mixer shaft in the mixing chamber. Since, however, a short time after the intermixing of the components the mass hardens, leakiness in the shaft entrance may make possible the passage of hardenable synthetic resin material. This leakage may lead to serious breakdowns, especially since the heat developed by the operation of the shaft of the apparatus accelerates the hardening of the reactive resin. In order to relieve the leakage problem, the invention provides for an apparatus for mixing multi-component resins of the kind given above. A forechamber is provided outside the shaft entrance to the mixing chamber, through which one of the components of the synthetic resin material to be mixed can be led on its way to the mixing chamber. Here, in the connection between the forechamber and the mixing chamber, a throttle can be provided, which allows for a higher pressure in the forechamber. Instead of this, a check valve can be built into the connection which upon mixing action in the mixing chamber effects an automatic shutoff and in operation, operates the same as a throttle.

In this way, the entrance of the mixer shaft in the mixing chamber is relieved of the high excess pressure which operates from outside. At the entrance, there is at best a lesser outer excess pressure, corresponding to the pressure difference existing between the forechamber and the mixing chamber against which it is easy to seal the shaft passage between forechamber and mixing chamber. Penetration of the single mixing component, that is in the forechamber, into the shaft passage can do no damage. The same pressure conditions occur for the shaft passage between the air pressure motor and the forechamber which shaft passage is under the same high unilateral excess pressure as that which occurs in connection with the mixing chamber. Also in this passage, the leakage of the individual mixing component which is to be found in the forechamber is neither disturbing nor harmful.

These and other objects of the invention will become more apparent with reference to the following detailed description of an apparatus forming specific embodiments, when read in conjunction with the drawings of the invention illustrating one example of carrying it out, in which:

FIGURE 1 is in longitudinal section and
FIGURE 2 is in a cross section taken along the line A–B of FIGURE 1.

A high pressure chamber is formed of a strong-walled cylinder 1 which is provided at the ends with connection sockets 2 and 3 for the connection respectively of an air pressure motor 4 and the cylinder to a nozzle.

The cylinder 1 is divided into a mixing chamber M and a forechamber V by a diaphragm 5. The chambers are connected together by a by-pass passage 6 in which a throttle 14, or a check valve which acts at the same time as a throttle 14, can be installed.

At 7 in the mixing chamber and at 8 in the forechamber, feed lines for both the mix components are fastened to the respective chambers and the synthetic resin is introduced at 7 and the hardener at 8.

In the mixing chamber, a rotatable mixer, mounted on bearings, is indicated which contains a star-shaped distributor wheel 9, an agitator 10 provided with notches and indentations and a perforated mixing cross bar 11. The mixer is connected, by a main drive shaft 12, to the air pressure motor 4. The notches cut into the agitator blade 10 have an advancing effect in the flow direction of the material which is from right to left in FIGURE 1 of the drawings.

The main drive shaft 12 turns in a bearing 13 mounted on the diaphragm 5, which can be secured by a stuffing box 15. In any case the passage of the main drive shaft 12 through the connection socket 2 is sealed from outside by a high pressure joint seal 16. The outer ends of the main drive shaft are provided with a plug connection 17 for the shaft 18 of the air pressure motor 4.

The arrangement of the mixing agent at the outlet end of the mixing chamber contains a center insert 19 which directs the resin mass to an opening for the passage of the mass to a nozzle. Between the cylinder 1 and the connection socket 3 which contains a nozzle, a perforated plate 20 is inserted.

Previously described apparatus according to the invention make it possible to force multi-component resins into hollow spaces, chiefly faulty and damaged materials. The high adhesiveness of these resins makes it possible for the separate parts to combine to produce great solidity in the final product.

A preferred form of application provides for injection of resins into hollow spaces of geological formations, the strength of which needs to be increased, as for example rotten, fragmental stones.

A further possibility in application of the invention is to lend strength to building materials, the solidity of which has been impaired by existing faulty or hollow spaces. Such hollow spaces can result during erection of prefabricated building elements, which can be joined together by injection into the hollow space.

Suggested as multi-component resins for this are the epoxy resins which possess considerable adhesive strength and particularly those which can be hardened by polyaminoamides.

It is to be understood that the above described arrangements are simply illustrative of the application of the principles of the invention. Numerous other arrangements may be readily devised by those skilled in the art which will embody the principles of the invention and fall within the spirit and scope thereof.

The embodiments of the invention in which an exclusive property or privilege is claimed are defined as follows:

An apparatus for mixing multi-component resins and for injecting the resins into openings which comprises, a mixing chamber having an outlet, means mounted in said chamber for mixing at least two components of a hardenable resin product under pressure, a power means mounted outside said chamber for driving said means for mixing, a drive shaft interconnecting said power means and said means for mixing, a forechamber mounted at the entrance of said shaft to said chamber, and passage means interconnecting said chamber and said forechamber by a path extending between the exteriors of said chamber and said forechamber to direct one of said components past said entrance and said shaft prior to introduction into said chamber.

References Cited by the Examiner

UNITED STATES PATENTS

| 1,246,003 | 11/1917 | Headley | 259—9 |
| 1,745,291 | 1/1930 | Bleil | 259—9 |
| 2,453,088 | 11/1948 | Dulmage. | |

FOREIGN PATENTS

| 854,273 | 11/1960 | Great Britain. |

IRVING BUNEVICH, *Primary Examiner.*

WALTER A. SCHEEL, *Examiner.*